United States Patent [19]
Geerling

[11] 3,732,475
[45] May 8, 1973

[54] MOTOR CONTROL CIRCUIT
[75] Inventor: Leonardus Johannes Geerling, Beaverton, Oreg.
[73] Assignee: Tektronix, Inc., Beaverton, Oreg.
[22] Filed: June 28, 1971
[21] Appl. No.: 158,923

[52] U.S. Cl. .................................................318/275
[51] Int. Cl. ..............................................H02r 3/14
[58] Field of Search...............318/139, 275, 375–380, 318/261, 273

[56] References Cited

UNITED STATES PATENTS

| 3,440,511 | 4/1969 | Igarashi et al. | 318/380 X |
| 3,188,547 | 6/1965 | Zelina | 318/380 X |
| 3,341,758 | 9/1967 | Plumpe, Jr. | 318/375 X |

Primary Examiner—Bernard A. Gilheany
Assistant Examiner—W. E. Duncanson, Jr.
Attorney—Adrian J. La Rue et al.

[57] ABSTRACT

A motor control circuit for rapidly starting and stopping a direct current motor in relation to a start-stop switch operation for energizing and de-energizing the motor is disclosed. The motor control circuit preferably includes a plurality of semiconductor switching means for controlling the power application thereto and also for applying dynamic braking thereto. The dynamic braking circuit means automatically shunts the armature of the motor for a predetermined time to be long enough to stop the motor when the start-stop switch disconnects the power thereto. The dynamic braking circuit means is energized by a separate power source for the predetermined time rather than the electromotive force generated from the motor.

8 Claims, 3 Drawing Figures

PATENTED MAY 8 1973　　　　　　　　　　　　　　　3,732,475

PRIOR ART

INVENTOR: LEONARDUS JOHANNES GEERLING

BY: _____
ATTORNEY

MOTOR CONTROL CIRCUIT

BACKGROUND OF THE INVENTION

The present invention relates to a motor control circuit for realizing rapid start and stop of a direct current motor with less power consumption. A direct current motor is frequently utilized in many applications because of its large initial torque, small dimension, light weight and so on.

Although many motor control circuits have been proposed such as, for example, U.S. Pat. Nos. 2,965,827 and 3,566,227, they include a semiconductor switching circuit for shunting the armature of the motor for applying the dynamic brake wherein such semiconductor switching circuit is rendered conducting only by the electromotive force generated from the motor while it is idling. Subsequently the semiconductor switching circuit will be less conductive or in a nonconductive state when the electromotive force decreases to a certain value because of the logarithmic characteristic of the semiconductor device. This means that the motor still takes a certain time before stopping completely. Another approach is disclosed in U.S. Pat. Nos. 3,188,547 and 3,379,949 which include a dynamic braking circuit having a switching transistor whose emitter-collector junction is connected in parallel with the armature of the motor and a driving transistor connected to the power source for supplying the input signal to the switching transistor. However, these circuits have the disadvantage that the driving transistor consumes power from the power source as long as the motor remains stopped. As a typical chart recorder, for example, take only several seconds to complete one graph, it is absolutely necessary for the driving motor of the recording media to operate rapidly at the rate speed and stop instantly in relation to energizing and de-energizing of the motor respectively.

SUMMARY OF THE INVENTION

According to the present invention, these defects of the prior motor control circuits can be eliminated completely and perfect control of a direct current motor is possible. The present motor control circuit includes a semiconductor switching circuit for energizing and de-energizing the motor by operating the start-stop switch by the operator and also circuit means to be automatically operated in synchronism with the start-stop switch. The circuit means, being energized by a separate power supply for a certain time, applies a dynamic brake to the motor by conducting semiconductor switching means connected in parallel with the armature independent of the electromotive force therefrom. The dynamic braking circuit means stops operation completely within a predetermined time in order to prevent the circuit from consuming power from the power supply, for example, a battery.

It is therefore one object of the present invention to provide an improved motor control circuit.

It is another object of the present invention to provide an instant start-stop motor control circuit.

It is still another object of the present invention to provide dynamic braking circuit means for shunting the armature of the motor for a predetermined time to be long enough to stop the motor completely and then stops the operation thereof.

It is yet an other object of the present invention to provide an improved motor control circuit of less power consumption.

The subject matter of the present invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DETAILED DESCRIPTION OF THE PREFERRED EMBODIMENT

Figure 1:
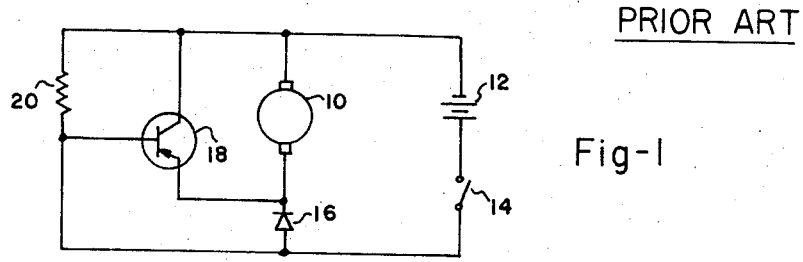
FIG. 1 is one example of a typical prior motor control circuit.

Before explaining the motor control circuit according to the present invention, one typical example of a prior motor control circuit will be described briefly referring to FIG. 1. A direct current motor 10 is connected to a direct current power source 12, which may be a battery of at least several volts, through a switch 14 and a diode 16 connected in the forward direction. When the motor 10 is energized by closing the switch 14 by the operator, the motor 10 begins to rotate and there develops a small voltage drop, for example, of 0.6 volt or so across the diode 16. The collector-emitter junction of a PNP transistor 18 is connected across the armature of the motor 10. A resistor 20 is connected between the collector and the base of the transistor 18, and the base is also connected to the anode of the diode 16.

In this circuit configuration, the transistor 18 is rendered nonconducting when the switch 14 is closed to energize the motor 10 because the voltage drop across the diode 16 maintains the base voltage to a certain positive value relative to the emitter voltage. On the other hand, the transistor 18 will be rendered conducting when the switch 14 is disconnected because no voltage drop exists across the diode 16.

The electromotive force generated from the motor 10 while the armature thereof is rotating due to the inertia thereof causes the flowing of a small amount of current through the emitter-base junction of the transistor 18 and the resistor 20. This base current is large enough to saturate the transistor 18 just after the time when the switch 14 is disconnected, and a major current, equivalent to the base current multiplied by the current amplification factor ($\beta$), will flow through the emitter-collector junction of the transistor 18. This transistor 18 applies a dynamic brake to the motor 10 and then the motor speed will suddenly decrease.

However, if the motor speed decreases to a slow value to generate the electromotive force not more than 1 volt, for example, the transistor 18 can not remain in the saturation region thereof because of the logarithmic characteristic of the diode 16 and the transistor 18. Subsequently the motor 10 takes a considerable time before stopping completely. Thus, the dynamic brake is effective only during a transient time just after the switch 14 is disconnected to stop the motor 10.

Moreover resistive elements connected in series with the motor 10 and the power source 12 are preferably eliminated to avoid power consumption especially when using a low voltage battery as the power source 12. However, the diode 16 connected in series with the motor 10 has a considerable resistive value and the voltage drop thereacross, for example 0.6 volts, decreases the effective electromotive force of the power source 12.

Figure 2:
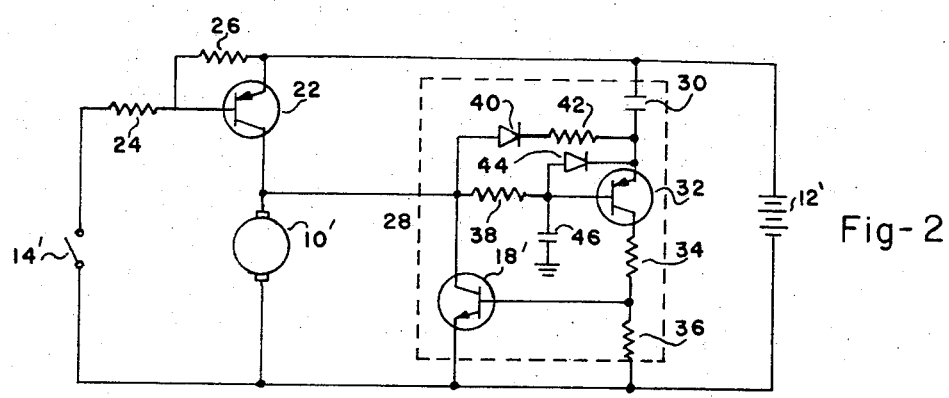
FIG. 2 is a circuit diagram of one embodiment of the motor control circuit in accordance with the present invention.

Referring to FIG. 2 illustrating the circuit diagram of one embodiment of the present motor control circuit, the operation thereof will be described in detail. A direct current motor 10' is connected to a direct current source 12' through the emitter-collector junction of a transistor 22 which operates similar to the switch 14 of FIG. 1 in combination with a switch 14' and biasing resistors 24 and 26 for the transistor 22. The resistive values of the resistors 24 and 26 are selected such that the transistor 22 is instantly operated to a saturated state to deliver enough power to the motor 10' when the switch 14' is closed by the operator. In the case when the transistor 22 is saturated, the resistive value and the voltage drop across the collector-emitter junction thereof are relatively small.

A dynamic braking circuit means 28 is employed for applying the dynamic brake to the motor 10' for a predetermined period to stop the motor 10' completely when the switch 14' is disconnected. The dynamic braking circuit means 28 consists of a switching transistor 18' whose collector-emitter junction is connected in parallel with the armature of the motor 10', and a series combination of a capacitor 30, the emitter-collector junction of a transistor 32 and resistors 34 and 36 connected between two terminals of the direct current power supply 12'. The base of the switching transistor 18' is connected to the common junction of the resistors 34 and 36, on the other hand, the base of the transistor 32 is connected to the collector of the switching transistor 18' through a resistor 38. A diode 40 and a resistor 42 are connected in series between the collectors of the transistors 18' and 32. Moreover, a diode 44 may be connected between the base and emitter of the transistor 32 to protect the transistor 32 from excessive reverse voltage. A capacitor 46 may be connected from the base of the transistor 32 to a certain low impedance point such as ground or the emitter of the transistor 32 to form a high pass filter whose operation will be described hereinafter in greater detail.

When the switch 14' is closed by the operator, the transistor 22 will saturate and deliver enough power to the motor 10' to rotate the armature thereof. In this condition, there is little voltage drop across the emitter-collector junction of the transistor 22 and approximately the entire voltage of the power supply 12' is applied across the motor 10'; therefore, the transistor 32 is in a nonconducting state and the switching transistor 18' also remains nonconducting. On the other hand, when the switch 14' is rendered disconnected by the operator or automatically, the transistor 22 immediately returns to nonconduction. The electromotive force generated from the motor 10' is applied to the collector of the switching transistor 18' and to the base of the transistor 32 through the resistor 38. (Although the electromotive force generated from the motor 10' depends on the efficiency of the motor 10', it is always a lower value than the voltage of the power supply 12'.) This turns on the transistor 32. The capacitor 30 is charged to the level of the voltage source 12' at the time constant which is substantially determined by the capacitor 30 and the resistor 34. When the transistor 32 is rendered conducting, the switching transistor 18' is also turned on. This results in applying dynamic braking to the motor 10' because the collector-emitter junction of the transistor 18' is connected in parallel with the armature of the motor 10'. Then decreased output voltage at collector of the transistor 18' accelerates the conduction of the transistor 32.

The conductivity of the transistors 32 and 18' is selected such that the transistor 32, the resistor 34, the switching transistor 18' and the resistor 38 form a positive feedback loop. The positive feedback operation ensures the rapid conduction of the switching transistor 18'. Therefore, the motor 10' will stop completely within a minimum time.

Even if the electromotive force from the motor 10' becomes zero, the PNP transistor 32 remains conducting and the switching transistor 18' also remains conducting until the capacitor 30 is charged up to the same voltage as the voltage of the power supply 12'. This time is substantially determined by the time constant of the capacitor 30 and the resistor 34. The time constant can be selected so that the switching transistor 18' returns to nonconduction after the motor stops completely.

There is no discharge path for the electron charge stored in the capacitor 30 until the switch 14' is closed again to start the motor 10' by the operator. When the motor 10' is energized again, current flows through the transistor 22 from the power supply 12' as well as the capacitor 30. The main discharge path of the electron charge stored in the capacitor 30 is formed by the capacitor 30, the transistor 22, the diode 40 and the resistor 42.

The time constant of the discharge current from the capacitor 30 is determined by the capacitor 30 and the resistor 42. The discharge current from the capacitor 30 ensures that the dynamic brake will not be applied to the motor 10' by reverse biasing the transistor 32 by the voltage drop across the diode 40 and the resistor 42. As a result of the logarithmic characteristic of the diode 40, it takes a longer time for the electron charge of the capacitor 30 to discharge completely and the charge prevents the transistor 32 from conducting accidentally by the noise from the motor 10' as well as from the power supply 12'. The time constant of the discharge path is selected as a longer value than the operation time of the motor 10'.

In order to avoid a voltage drop across the series combination of the diode 40 and the resistor 42 which exceeds or develops close to the maximum tolerable reverse voltage of the base-emitter junction of the transistor 32, the diode 44 is also connected between the base-emitter junction of the transistor 32. The diode 44 eliminates the possibility of breaking down or degrading transistor 32.

The capacitor 46 connected between the base of the transistor 32 and the ground forms a low pass filter so that high frequency noise generated, for example, from the commutator of the motor 10' does not flow into the transistor 32. This high frequency noise may develop to enough magnitude to cause great damage to the transistors 18' and 32 and the associated circuit components because of the positive feedback.

Figure 3:
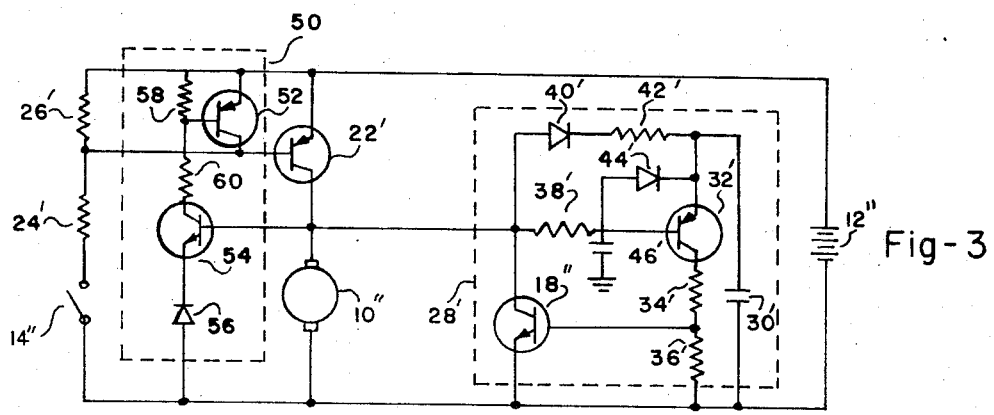
FIG. 3 is another embodiment of the motor control circuit according to the present invention.

FIG. 3 illustrates another embodiment of the motor control circuit according to the present invention including a motor speed control circuit for maintaining the motor speed at a constant value regardless the magnitude of the power supply.

In this embodiment, the capacitor 30' is connected between the emitter of the transistor 32' and the negative terminal of the power supply 12" rather than the positive terminal thereof as in FIG. 2. Accordingly, the capacitor 30' is charged to the level of the power supply 12" through transistor 22', diode 40' and resistor 42' while the switch 14" is closed by the operator for energizing the motor 10".

As mentioned above relating to FIG. 2, the time constant of the capacitor 30' and the resistor 42' is selected such that the transistors 32' and 18" are maintained nonconducting by the voltage drop across the diode 40' and the resistor 42' due to a small charging current of the capacitor 30'.

When the switch 14" is disconnected by an electric circuit utilizing the motor control circuit or by the operator, the electromotive force generated from the motor 10", which does not exceed the voltage of the power supply 12" or the voltage across the capacitor 30', promptly turns on the transistor 32' as well as the transistor 18" by the above-mentioned positive feedback operation. Then the motor 10" will stop instantly because of the dynamic brake of the transistor 18".

The capacitor 30' keeps the transistors 32' and 18" in a conducting state of sufficient duration for stopping the motor 10" because of the energy stored in the capacitor 30'. The discharge time constant of the capacitor 30' can be selected by the capacitor 30' and the resistor 34'. Therefore, the dynamic breaking circuit mainly comprising the transistors 32' and 18" does not consume extra power from the power source 12" when the motor is de-energized. This ensures a long life of a battery employed as the power supply 12".

Moreover, this embodiment includes a motor speed control circuit 50 mainly consisting of a transistor 52 connected between the emitter and base electrodes of the transistor 22' and a transistor 54 whose base-emitter junction is connected in parallel with the motor 10" through constant voltage means such, for example, as a Zenner diode 56. The collector of the transistor 54 is connected to the positive terminal of the power supply 12" through resistors 58 and 60. The common junction of the resistors 58 and 60 is connected to the base of the transistor 52.

When the voltage across the motor 10" exceeds considerably the voltage across the Zenner diode 56 as the motor 10" is operating, the transistor 54 begins to conduct and also the transistor 52 conducts. The collector current of the transistor 52 flows into the resistor 24' and raises the base voltage of the transistor 22'. This makes the transistor 22' less conductive and decreases the voltage across the motor 10". The motor speed control circuit 50 makes the motor 10" operate at substantially constant speed over a wider voltage range of the power supply 12" or insensitive to the variations thereof. The motor speed control circuit 50 is useful when a battery is employed as the power supply 12" wherein the terminal voltage changes gradually.

As it will be clear from the above description, the present motor control circuit can rapidly control a direct current motor in an on and off condition in synchronism with the operation of the switch 14' with less power consumption. The motor control circuit according to the present invention will preferably be utilized in a measuring instrument such as a chart recorder, which is disclosed in U.S. Pat. No. 3,701,993. by the same inventor and assigned to the same assignee, and electrical devices such as a magnetic tape driver for an information processing machine, a tape recorder and a video tape recorder.

Although the above description covers a preferred embodiment of the present invention, it will be apparent to those skilled in the art that many changes and modifications may be made without departing from the subject matter thereof and the scope.

What is claimed is:

1. A motor control circuit for promptly starting and stopping a direct-current motor in response to energizing and de-energizing the motor, comprising:
   switch means in series with said motor for selectively connecting said motor to a power source;
   dynamic braking circuit means shunting the armature of said motor immediately after said motor is de-energized; and
   circuit means for holding said dynamic braking circuit means operable over a pre-determined period of time to ensure complete stoppage of said motor, said circuit means also preventing said braking means from consuming power from said direct-current power source.

2. A motor control circuit according to claim 9 wherein said switch means consists of a semiconductor switching device; said dynamic braking circuit means consists of a first transistor and a second transistor, said first transistor being a switching transistor of one conductivity type whose collector-emitter terminals are connected across the armature of said motor, and said second transistor being a switch driver transistor of the opposite conductivity type whose base and collector are connected respectively to the collector and base of said switching transistor through resistors; and said circuit means is a capacitor connected between the emitter of said second transistor of said dynamic braking circuit means and said power source.

3. A motor control circuit according to claim 1 further including an unidirectional device and a resistor connected in series between said capacitor of said circuit means and said semiconductor switching device of said switch means to provide a discharge path for said capacitor.

4. A motor control circuit, comprising:
   a DC motor;
   a DC power source;
   first circuit means connected to said DC motor for selectively applying power from said DC power source to said motor thereby energizing said motor and causing it to rapidly reach operating speed;

second circuit means connected across the armature of said DC motor shunting said armature for a short period of time when said first circuit means removes power applied from said DC power source to said DC motor, thereby applying dynamic braking for a period sufficient to ensure complete stoppage of said DC motor; and third circuit means for determining period of time said dynamic braking circuit is operable, said third circuit means also preventing said second circuit means from consuming power from said DC power source.

5. A motor control circuit according to claim 4 wherein said first circuit means includes a switching transistor connected in series with said DC motor; said second circuit means includes first transistor means connected in parallel with the armature of said DC motor, and second transistor means connected to said first transistor means in driving relation; and third circuit means includes charge storage means connected between said second transistor means and said DC voltage source.

6. A motor control circuit according to claim 5 wherein said third circuit means further includes a diode and a resistor connected in series between said charge storage means and said first circuit means to provide a discharge path for said charge storage means, said diode being connected in reverse polarity across the base-emitter junction of said second transistor means of said second circuit means to provide reverse bias to said second transistor when said diode conducts.

7. A motor control circuit for controlling start-stop operation of a DC motor, comprising:

switching means including switching transistor means for controlling application of a DC voltage source to said DC motor, energy storage means for storing energy from said DC voltage source while said switching means is closed to energize said DC motor, and dynamic braking means which is energized by said energy storage means when said switching means opens for applying the dynamic brake to said DC motor at least until said DC motor stops completely, and which is de-energized thereafter by discharging the energy stored in said energy storage means.

8. A motor control circuit according to claim 7 wherein motor speed control means is connected across the armature of said DC motor to detect the voltage thereacross for controlling the degree of conduction of said switching transistor means.

* * * * *